Patented Mar. 7, 1933

1,900,014

UNITED STATES PATENT OFFICE

GEORGE D. GRAVES, OF WILMINGTON, DELAWARE, ASSIGNOR TO E. I. DU PONT DE NEMOURS & COMPANY, OF WILMINGTON, DELAWARE, A CORPORATION OF DELAWARE

ANTIFREEZE COMPOSITION

No Drawing. Application filed May 6, 1930. Serial No. 450,318.

This invention relates to anti-freeze compositions, and more particularly to liquid compositions containing sorbitol.

Various compositions have heretofore been proposed for use in the cooling systems of automobiles, aeroplanes, and other mechanisms, in order to prevent freezing and consequent damage to the machine at low temperatures. Alcohol has generally been used for this purpose, but it is volatile at relatively low temperatures. Glycerin mixtures have also been proposed, but inasmuch as glycerin is a relatively viscous material, it has a tendency to retard free circulation of the cooling liquid. The use of oil has been suggested, but is found to have a very low heat capacity. Furthermore, the use of solutions of various salts, such as calcium chloride, has been attempted, but this type of anti-freeze material has proved unsatisfactory due to its corrosive action on metal.

It is an object of this invention to provide a new anti-freeze material suitable for use in automobile radiators and other types of cooling devices, which is substantially free from the above mentioned defects. A further object is to provide a material containing sorbitol and, in addition, other types of alcohols, such as the glycols. A still further object is to provide a liquid heating and refrigerating composition which can be easily compounded by dissolving or mixing its various ingredients one with another. Other objects will appear hereinafter.

These objects are accomplished by the following invention which comprises forming a solution of sorbitol and water together with other types of alcohols, including various glycols, such as ethylene, propylene and butylene glycols. The solution may contain in addition to water and sorbitol one or more of the alcoholic ingredients in proportions which may be varied widely according to the temperature conditions under which the product is to be used.

In the following table I have set forth several of the preferred embodiments of my invention, but they are presented only for purposes of illustration and not as a limitation.

| Example | Sorbitol | Propylene Glycol | Ethanol | Water |
|---|---|---|---|---|
| | Per cent | Per cent | Per cent | Per cent |
| 1 | .5 | 40 | | 59.5 |
| 2 | 5.0 | 23 | | 72.0 |
| 3 | 5.0 | 37 | | 68.0 |
| 4 | 10.0 | 45 | | 45.0 |
| 5 | 30.0 | 25 | | 45.0 |
| 6 | 30.0 | 11 | 15 | 44.0 |

Although in the above preferred embodiments of my invention I have indicated various specific proportions of sorbitol and of the various glycols which may be employed with special benefit in liquid anti-freeze compositions, it is to be understood that the particular proportions of any given ingredient will vary in accordance with the use to which the composition is to be put and the temperature conditions under which it is to be used. For example, although I have indicated a sorbitol range of .5% to 30%, the preferred range in making up an anti-freeze satisfactory for ordinarily cold weather is about .5% to 10%, with amounts of glycol ranging from 23 to 45%. A satisfactory composition may consist of even as small amounts of sorbitol as .1%, with proportionately higher percentages of glycol. It will, therefore, be apparent that the proportions of the various components may be varied widely within the scope of my invention.

Furthermore, although I have indicated propylene glycol as one of the preferred ingredients of my anti-freeze composition, I may employ other glycols, such as ethylene and butylene glycols, as well as combinations of these materials with other materials possessing anti-freeze properties, such as ethanol and glycerin.

The anti-freeze composition of the present invention is characterized by the property of remaining liquid at very low temperatures and of being relatively non-volatile at ordinary temperatures, as well as at temperatures much higher than ordinary. It can be used in cooling and refrigerating systems wherever a liquid composition of low freezing point is desired. It is thus of especial value in automobile and aeroplane cooling systems where the cooling agent is circulated from a radiator tube to the jacket of the engine and where the cooling agent is required to withstand temperatures much above the ordinary, as well as temperatures below the freezing point of water. It is also of particular value for use in heating systems because of its relatively non-volatile character and because of the fact that danger of accidental freezing with consequent damage to the system is thereby prevented at low temperatures. An additional advantage is that the composition, being of a relatively thinly fluid nature, can readily circulate through a cooling system with minimum frictional resistance.

As many apparently and widely different embodiments of this invention may be made without departing from the spirit and scope thereof, it is to be understood that I do not limit myself to the specific embodiments thereof except as defined in the appended claims:

I claim:

1. A liquid anti-freeze composition which is substantially non-volatile and capable of remaining liquid at low temperatures, comprising water, sorbitol and a glycol, the sorbitol being present in an amount which is at least .5% of the mixture.

2. A liquid anti-freeze composition which is substantially non-volatile and capable of remaining liquid at low temperatures, which comprises water, sorbitol, and a glycol of the group which consists of ethylene, propylene and butylene glycols, the sorbital being present in an amount which is at least .5% of the mixture.

3. A liquid anti-freeze composition which is substantially non-volatile and capable of remaining liquid at low temperatures, comprising a mixture containing 44 to 72% water, .5 to 30% sorbitol, and 11 to 45% propylene glycol.

4. A liquid anti-freeze composition which is substantially non-volatile and capable of remaining liquid at low temperatures, comprising water, a glycol, glycerin, and sorbitol, the sorbitol being present in an amount which is at least .5% of the mixture.

5. A liquid anti-freeze composition which is substantially non-volatile and capable of remaining liquid at low temperatures, comprising water, glycerin, a glycol of the group which consists of ethylene, propylene and butylene glycols, and sorbitol, the sorbitol being present in an amount which is at least .5% of the mixture.

6. A liquid anti-freeze composition which is substantially non-volatile and capable of remaining liquid at low temperatures in aqueous solution, comprising sorbitol and a glycol, the sorbitol being present in an amount which is at least .5% of the mixture.

7. A liquid anti-freeze composition which is substantially non-volatile and capable of remaining liquid at low temperatures in aqueous solution, comprising a glycol, glycerin, and sorbitol, the sorbitol being present in an amount which is at least .5% of the mixture.

In testimony whereof, I affix my signature.

GEORGE D. GRAVES.

CERTIFICATE OF CORRECTION.

Patent No. 1,900,014.                                                  March 7, 1933.

GEORGE D. GRAVES.

It is hereby certified that error appears in the printed specification of the above numbered patent requiring correction as follows: Page 1, lines 50 and 51, strike out the lead line and the word "Propylene", and in the heading to the boxed table, column 3, for "Glycol" read "Propylene Glycol"; and that the said Letters Patent should be read with these corrections therein that the same may conform to the record of the case in the Patent Office.

Signed and sealed this 11th day of April, A. D. 1933.

M. J. Moore.

(Seal)                                                       Acting Commissioner of Patents.